Patented Nov. 30, 1943

2,335,698

UNITED STATES PATENT OFFICE 2,335,698

DYESTUFFS OF THE ANTHRAQUINONE SERIES

William L. Rintelman, Glassboro, N. J., assignor to E. I. du Pont de Nemours & Company, Wilmington, Del., a corporation of Delaware No Drawing. Application April 24, 1941, Serial No. 390,106

4 Claims. (Cl. 260—303)

This invention relates to the preparation of the dyestuffs of the anthraquinone series and more particularly to the preparation of new red dyes of the anthraquinone thiazole group.

It has been known for a number of years that in general the anthraquinonearylthiazoles, produced by the condensation of an aldehyde with 1-mercapto-2-aminoanthraquinones, dye in yellow shades and this is true even where the aryl group is an anthraquinone nucleus as more particularly described in U. S. P. 1,090,621. Note also U. S. P. 164,784 in which the diaryl 1:2:5:6-anthraquinone dithiazoles and the diaryl 1:2:5:8-dithiazoles are mentioned.

I have found that new and valuable dyestuffs which possess unusual strength and which dye fibers from an alkaline hydrosulfite vat in burgundy to violet shades and which are fast to light, chlorine and washing can be produced by condensing 1:5-dimercapto-2:6-diaminoanthraquinone or its further simple substitution derivatives with 1-amino-2-anthraquinone aldehyde which may also carry simple monovalent substituents. This class of dyestuffs has the following general formula:

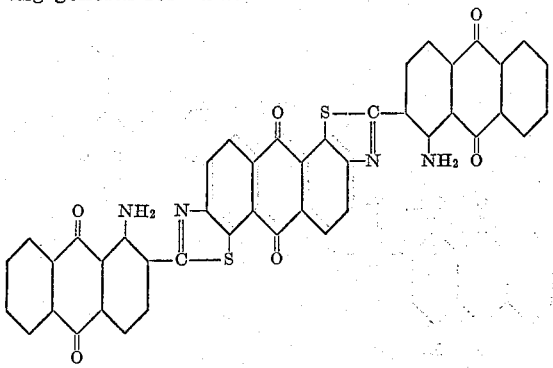

The characteristic feature of these new products is that both end anthraquinone nuclei carry an amino group in the alpha position ortho to the thiazole linkage. This particular grouping has been found to change the shade of what would otherwise be a yellow dye to one which dyes in burgundy shades of excellent strength and fastness properties. The shade may be somewhat altered by the introduction of substituents either in the end anthraquinone nuclei or in the center anthraquinone nucleus. The introduction of such substituents is usually brought about by employing further substituted intermediates in the preparation of the final dyestuffs.

These new dyes are prepared, preferably by dissolving 1:5 - dimercapto - 2:6 - diaminoanthraquinone in sulfuric acid of from 90 to 100% and then adding two molecular proportions of 1-amino-2-anthraquinone aldehyde. The reaction takes place readily even at room temperatures. The reaction may be hastened by heating to 100° C. or higher. Further substituted 1,5-dimercapto-2,6-diaminoanthraquinone and further substituted 1-amino-2-anthraquinone aldehyde may be reacted in the same manner to give derivatives of the parent material.

These dyes may also be produced by reacting 1-amino-2-anthraquinone acid chloride (or its substitution derivatives) with the dry disodium or dipotassium salt of 1:5-dimercapto-2:6-diaminoanthraquinone in a high boiling solvent, such as dichlorobenzene, and finally ring closing the ester by heating in strong sulphuric acid.

The following examples are given to illustrate the invention. The parts used are by weight.

Example 1

Ten parts of 1:5-dimercapto-2:6-diaminoanthraquinone (or the disulfide described in U. S. P. 1,894,790) are dissolved in 250 parts of 96% sulfuric acid; 20 parts of 1-amino-2-anthraquinone aldehyde are then added and the mass is heated to 90-100° C. on a water bath. This temperature is maintained from one to two hours or until the reaction is finished, as evidenced by the fact that the acid solution becomes yellow-brown in color. The concentration of the acid is then reduced to about 85% by the slow addition of 32 parts water at the above temperature. Large yellow crystals of the sulfate are precipitated which are readily filtered off on a medium carborundum filter. After washing several times, the product is left as a yellow filter cake which is then hydrolyzed to the free base by slurrying in water. The free color base is obtained as deep red crystals. It dissolves in strong sulfuric acid with a yellow coloration. It dissolves in the usual alkaline hydrosulfite vat with a blue-violet color from which cotton is dyed in strong burgundy shades, very fast to bleach, washing and light.

Example 2

Ten parts of 1:5-dimercapto-2:6-diaminoanthraquinone, 24.5 grams of 1-amino-4-brom-2-anthraquinone aldehyde are reacted in 250 grams of 96% sulfuric acid as described in Example 1. The dibromo-derivative of the product of Example 1 is obtained as yellow crystals of the sulfate which on hydrolysis yield the free color base in the form of a red crystalline mass. This product dissolves in 96% sulfuric acid with a yellow color from which it is precipitated in the form of violet flakes on drowning in water. It vats with a blue-violet vat from which it dyes cotton in red-violet shades.

Example 3

Ten parts of 1:5-dimercapto-2:6-diamino-3:7-dichloroanthraquinone (described in U. S. P. 2,164,784) are dissolved in 250 parts of sulfuric acid (96%). 15 parts of 1-amino-2-anthraquinone aldehyde are then added. The temperature is raised to 120° C. and held for one hour. The acid concentration is then reduced to 80% and the crystals which separate are filtered off; or a less pure product may be isolated by drowning the reaction mass. The free base is obtained in the form of violet crystals or as an amorphous violet paste depending upon the method of isolation. This compound dyes cotton bluish red shades from a blue violet vat. Instead of using the dichloro compound, the dibromo or the disulfodimercaptodiaminoanthraquinone, described in the above patent, may be employed.

*Example 4*

Ten parts of 1:5-dimercapto (sodium salt) 2:6-diamino-anthraquinone are suspended in 250 parts of dry dichlorobenzene. 20 parts of 1-amino-2-anthraquinone carbonyl chloride are added and the suspension is heated to boiling and held there for several hours. The red crystals are filtered off, washed with alcohol and dried. The dry product is dissolved in 96% sulfuric acid and heated to 100° C. to insure ring-closure and then drowned in water. The product thus obtained is essentially the same as that described in Example 1.

In the above examples 1-amino-2-anthraquinone-phenylazomethines may be substituted for the 1-amino-2-anthraquinone-aldehydes, in which case temperatures somewhat above room temperature should be employed to effect hydrolysis of the azomethine compound to the corresponding aldehyde in the reaction.

Various modifications may be made in the process above described. The condensation being generally effected by the methods normally employed in the preparation of unsubstituted dianthraquinonyl 1:2:5:6-anthraquinone dithiazoles. Other substituted intermediates may also be employed such as 1-amino-4-anilino-2-anthraquinone aldehyde and its higher homologues.

I claim:

1. The compounds of the class consisting of those of the formula:

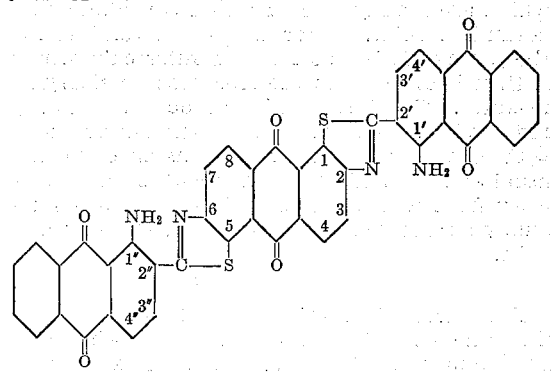

and the dihalogen derivatives in which the halogen is in one of the pairs of positions —4′, 4″— and —3, 7—.

2. The compound of the formula:

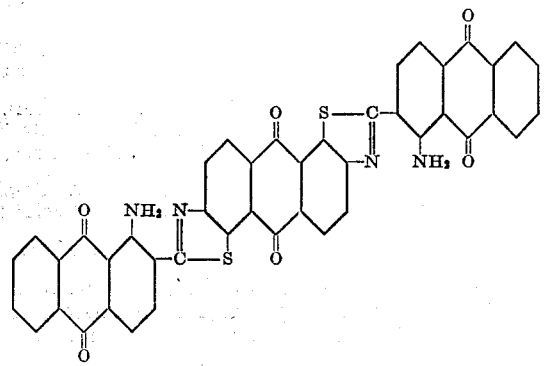

3. The compounds of the general formula:

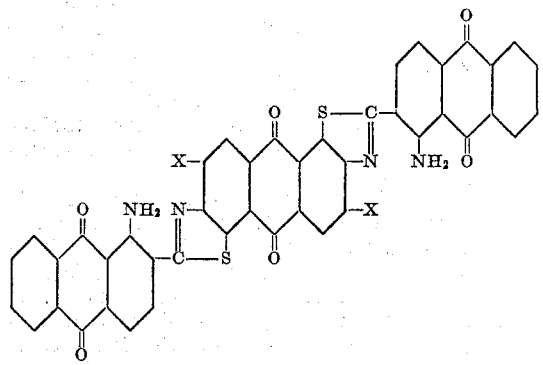

wherein X stands for halogen.

4. The compounds of the general formula:

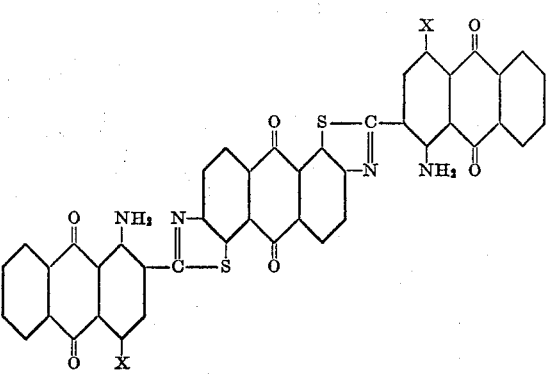

wherein X stands for halogen.

WILLIAM L. RINTELMAN.